United States Patent
Kuwabara et al.

(10) Patent No.: US 8,573,615 B2
(45) Date of Patent: Nov. 5, 2013

(54) SUSPENSION SYSTEM FOR VEHICLE (75) Inventors: Naoki Kuwabara, Saitama (JP); Bunzo Seki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 129 days.

(21) Appl. No.: 13/005,170

(22) Filed: Jan. 12, 2011

(65) Prior Publication Data

US 2011/0174568 A1    Jul. 21, 2011

(30) Foreign Application Priority Data

Jan. 15, 2010  (JP) ................. 2010-006657

(51) Int. Cl.
*B60G 3/04* (2006.01)
*B60G 11/26* (2006.01)
*B62D 7/06* (2006.01)
*B62D 7/18* (2006.01)

(52) U.S. Cl.
USPC ............ 280/93.512; 280/124.145; 280/93.51; 280/124.154; 180/253; 180/376

(58) Field of Classification Search
USPC ................. 180/233, 234, 252, 253, 376; 280/93.512, 93.51, 124.134, 124.154
See application file for complete search history.

(56) References Cited

U.S. PATENT DOCUMENTS

| | | | | |
|---|---|---|---|---|
| 4,105,222 A * | 8/1978 | Buchwald | .............. | 280/124.104 |
| 4,321,988 A * | 3/1982 | Bich | ........................ | 188/321.11 |
| 4,648,623 A * | 3/1987 | Cameron | .............. | 280/124.155 |
| 4,653,773 A * | 3/1987 | Graft | ........................ | 280/93.5 |
| 4,744,586 A * | 5/1988 | Shibahata et al. | ..... | 280/124.143 |
| 4,875,703 A * | 10/1989 | Murakami | ............ | 280/124.138 |
| 4,883,287 A * | 11/1989 | Murakami et al. | ..... | 280/124.135 |
| 5,087,229 A * | 2/1992 | Hewko et al. | ................. | 475/149 |
| 5,199,730 A * | 4/1993 | Westfall et al. | .......... | 280/93.512 |
| 5,346,241 A * | 9/1994 | Lee | ........................ | 280/124.142 |
| 5,588,660 A * | 12/1996 | Paddison | ................. | 280/93.512 |
| 5,873,587 A * | 2/1999 | Kawabe et al. | ........ | 280/124.135 |
| 5,938,219 A * | 8/1999 | Hayami et al. | ......... | 280/124.135 |
| 5,984,330 A * | 11/1999 | Hasshi et al. | .......... | 280/124.146 |
| 6,027,130 A * | 2/2000 | Kawabe et al. | ........ | 280/124.135 |
| 6,089,582 A * | 7/2000 | Hasshi | .................... | 280/93.512 |
| 6,116,627 A * | 9/2000 | Kawabe et al. | .......... | 280/124.15 |
| 7,117,599 B2 * | 10/2006 | Sadanowicz et al. | .... | 29/894.361 |
| 7,140,625 B2 * | 11/2006 | Dean | ..................... | 280/124.146 |
| 7,762,568 B2 * | 7/2010 | Tatsumi et al. | ......... | 280/124.137 |
| 7,891,684 B1 * | 2/2011 | Luttinen et al. | ......... | 280/124.136 |
| 7,946,602 B2 * | 5/2011 | Shimatani et al. | ..... | 280/124.152 |

(Continued)

FOREIGN PATENT DOCUMENTS

JP    2008-302813 A    12/2008

*Primary Examiner* — Paul N Dickson
*Assistant Examiner* — George Spisich
(74) *Attorney, Agent, or Firm* — Birch, Stewart, Kolasch & Birch, LLP (57) ABSTRACT

A suspension system suitable for a small-sized vehicle such as an all terrain vehicle. A strut damper is arranged wherein a downwardly extending line of an axis of the strut damper is located in front of a drive shaft extending to the depth of a drawing from the rotational center of a front wheel. As interference between the strut damper and the drive shaft is not a concern, a mounting position of the strut damper can be fully lowered. In addition, the length of the axis of the strut damper can be fully secured. Therefore, the height of the vehicle can be lowered. In addition, the design of a vehicle body is facilitated.

19 Claims, 8 Drawing Sheets

(56) References Cited

U.S. PATENT DOCUMENTS

| | | |
|---|---|---|
| 7,967,304 B2 * | 6/2011 | Kwon .............................. 280/89 |
| 8,152,185 B2 * | 4/2012 | Siebeneick ............ 280/124.134 |
| 2004/0232645 A1 * | 11/2004 | Bortz et al. ............ 280/124.125 |
| 2006/0006623 A1 * | 1/2006 | Leclair .................... 280/93.512 |
| 2006/0054423 A1 * | 3/2006 | Murata ........................ 188/18 A |
| 2009/0140502 A1 * | 6/2009 | Sasaki et al. ............... 280/5.522 |

* cited by examiner

SUSPENSION SYSTEM FOR VEHICLE

CROSS-REFERENCE TO RELATED APPLICATIONS

The present application claims priority under 35 USC 119 to Japanese Patent Application No. 2010-006657 filed on Jan. 15, 2010 the entire contents of which are hereby incorporated by reference.

BACKGROUND OF THE INVENTION

1. Field of the Invention

This invention relates to a vehicle, more particularly to a small-sized vehicle provided with a strut damper.

2. Description of Background Art

A strut damper configured by a damper exhibiting damping action and a spring exhibiting restoring action is favorably adopted as a suspension system for a wheel.

Therefore, structures for attaching such strut dampers have been proposed. See, for example, FIG. 2 of JP-A No. 2008-302813.

As shown in FIG. 2 in the JP-A No. 2008-302813, a shock absorber (13) (a numeral in parentheses denotes a reference sign described in JP-A No. 2008-302813, the same hereafter.) is vertically arranged. A downwardly extending line of the axis of the shock absorber (13) substantially crosses the rotational center of a wheel (W).

The wheel (W) is driven by a drive shaft not shown extending to the depth of the drawing from the rotational center. To avoid interference with the drive shaft, the shock absorber (13) is arranged on the upside of the rotational center of the wheel (W).

Therefore, an upper end of the shock absorber (13) is located in a considerably high position.

In the meantime, it is demanded for a small-sized vehicle represented by an all terrain vehicle that the vehicle height is low.

However, when the shock absorber (13) described in JP-A No. 2008-302813 is adopted in a vehicle, the vehicle height inevitably becomes high. That is, it is difficult to adopt a suspension system in JP-A No. 2008-302813 in a small-sized vehicle.

A more suitable suspension system of a wheel is required for a small-sized vehicle such as an all terrain vehicle.

SUMMARY AND OBJECTS OF THE INVENTION

An object of an embodiment of the present invention is to provide suspension system technology suitable for a small-sized vehicle such as an all terrain vehicle.

According to an embodiment of the present invention, a vehicle is provided with a body frame, a power generation engine which is attached to the body frame and which generates power, a transmission system that transmits the output generated in the power generation engine and a drive shaft which extends in a direction of vehicle width and which transmits the power transmitted by the transmission system to a wheel. A strut damper is provided with an upper end of which is coupled to the body frame and which extends downward with a knuckle supporting member extending downwardly from a lower part of the strut damper. A lower arm extends in the direction of vehicle width and couples a lower part of the knuckle supporting member to the body frame. A knuckle is attached to the knuckle supporting member rotatably around a king pin axis and supports the wheel. A tie rod extends in the direction of vehicle width and rotates the knuckle around the king pin axis. The strut damper is arranged in a location in which a downward extending line of an axis of the strut damper is located in front of or at the back of the drive shaft in a side view of the vehicle.

According to an embodiment of the present invention, the knuckle supporting member is configured by an upper part supporting part that supports an upper part of the knuckle, a lower part supporting part that supports a lower part of the knuckle and a bridge part that connects the upper part supporting part and the lower part supporting part and the bridge part extends in parallel with the axis of the strut damper.

According to an embodiment of the present invention, the bridge part is arranged outside the axis of the strut damper in the direction of vehicle width with the upper part supporting part and the lower part supporting part extending in a longitudinal direction of the vehicle from the bridge part. The knuckle supporting member is a C-shaped member in a left side view of the vehicle, and a backwards C-shaped member in a right side view of the vehicle.

According to an embodiment of the present invention, a tie rod supporting part formed in the knuckle to couple to the tie rod is provided at the back of the drive shaft when the downwardly extending line of the axis of the strut damper is located in front of the drive shaft in the side view of the vehicle and the tie rod supporting part is provided in front of the drive shaft when the downwardly extending line is located at the back of the drive shaft.

According to an embodiment of the present invention, a caliper supporting part that supports a brake caliper for braking the wheel is formed in the knuckle with the caliper supporting part being provided at the back of the drive shaft when the downwardly extending line of the axis of the strut damper is located in front of the drive shaft in the side view of the vehicle and the caliper supporting part is provided in front of the drive shaft when the downwardly extending line is located at the back of the drive shaft.

According to an embodiment of the present invention, a steering angle stopper for limiting a turning angle of the wheel is provided between the knuckle supporting member and the knuckle.

According to an embodiment of the present invention, the drive shaft is a constant-velocity ball joint provided with each boot at an end on the side of the wheel and at an end on the central side of a vehicle body and the boot on the side of the wheel is arranged in a position overlapped with the bridge part in a front view of the vehicle.

According to an embodiment of the present invention, a lower end of the strut damper extends to a position overlapped with a swinging area of the drive shaft in the front view of the wheel.

According to an embodiment of the present invention, the strut damper is arranged in a location in which the downwardly extending line of the axis of the strut damper is located in front of or at the back of the drive shaft. More specifically, as interference between the strut damper and the drive shaft is not a concern, a mounting position of the strut damper can be fully lowered. In addition, the length of the axis of the strut damper can be fully secured. Therefore, the height of the vehicle can be lowered and in addition, the design of the vehicle body is facilitated.

According to an embodiment of the present invention, the knuckle supporting member is configured by the upper part supporting part that supports the upper part of the knuckle, the lower part supporting part that supports the lower part of the knuckle and the bridge part that connects the upper part supporting part and the lower part supporting part. The bridge part extends in parallel with the axis of the strut damper.

As the bridge part extends in parallel with the axis of the strut damper, the strut damper and the bridge part can be connected with a lower end of the strut damper along the bridge part. As a coupling part can be fully lengthened, the strength of joining can be easily secured without making the structure of the coupling part intricate.

According to an embodiment of the present invention, the bridge part is arranged outside the axis of the strut damper in the direction of vehicle width. More specifically, the bridge part is set off outside the axis of the strut damper in the direction of vehicle width. As a result, the upper part supporting part extending in a longitudinal direction of the vehicle from an upper part of the bridge part can be extended in the longitudinal direction of the vehicle without interfering with the strut damper.

According to an embodiment of the present invention, the tie rod supporting part formed in the knuckle is provided at the back of the drive shaft when the downwardly extending line of the axis of the strut damper is located in front of the drive shaft in the side view of the vehicle and the tie rod supporting part is provided in front of the drive shaft when the downwardly extending line is located at the back of the drive shaft. More specifically, the knuckle supporting member is arranged on one side with the drive shaft in the center and the tie rod is arranged on the other side. As a result, the tie rod can be easily arranged without interfering with the knuckle supporting member.

According to an embodiment of the present invention, the caliper supporting part formed in the knuckle is provided at the back of the drive shaft when the downwardly extending line of the axis of the strut damper is located in front of the drive shaft in the side view of the vehicle and the caliper supporting part is provided in front of the drive shaft when the downwardly extending line is located at the back of the drive shaft. More specifically, the knuckle supporting part is arranged on one side with the drive shaft in the center and the brake caliper is arranged on the other side. As a result, the brake caliper can be easily arranged without interfering with the knuckle supporting member.

According to an embodiment of the present invention, the steering angle stopper that limits the turning angle of the wheel is provided between the knuckle supporting member and the knuckle.

If the steering angle stopper is provided between a steering shaft and a stay that turnably supports the steering shaft, each stopper part is required to be provided to the steering shaft and the stay. Thus, the procurement cost and the mounting cost of the parts increase.

In the meantime, according to an embodiment of the invention, the stopper part has only to be formed in the knuckle supporting member and the knuckle. As a result, no stopper part is required to be provided to the steering shaft and the stay, and the procurement cost and the mounting cost of the parts can be reduced.

According to an embodiment of the present invention, the drive shaft is the constant-velocity ball joint provided with each boot at the end on the side of the wheel and at the end on the central side of the vehicle body and the boot on the side of the wheel is arranged in the position overlapped with the bridge part in the front view of the vehicle.

The bridge part plays a role in guarding foreign matter such as a flying stone from being projected toward the boot on the side of the wheel. More specifically, a boot protective cover can be omitted.

According to an embodiment of the present invention, the lower end of the strut damper extends to the position overlapped with the swinging area of the drive shaft in the front view of the vehicle.

The position of the upper end of the strut damper is lowered, the vehicle height can be fully lowered, and the center of gravity of the vehicle can be lowered.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring to the drawings, an embodiment of the present invention will be described below. The drawings shall be viewed in a direction of reference signs.

Figure 1:
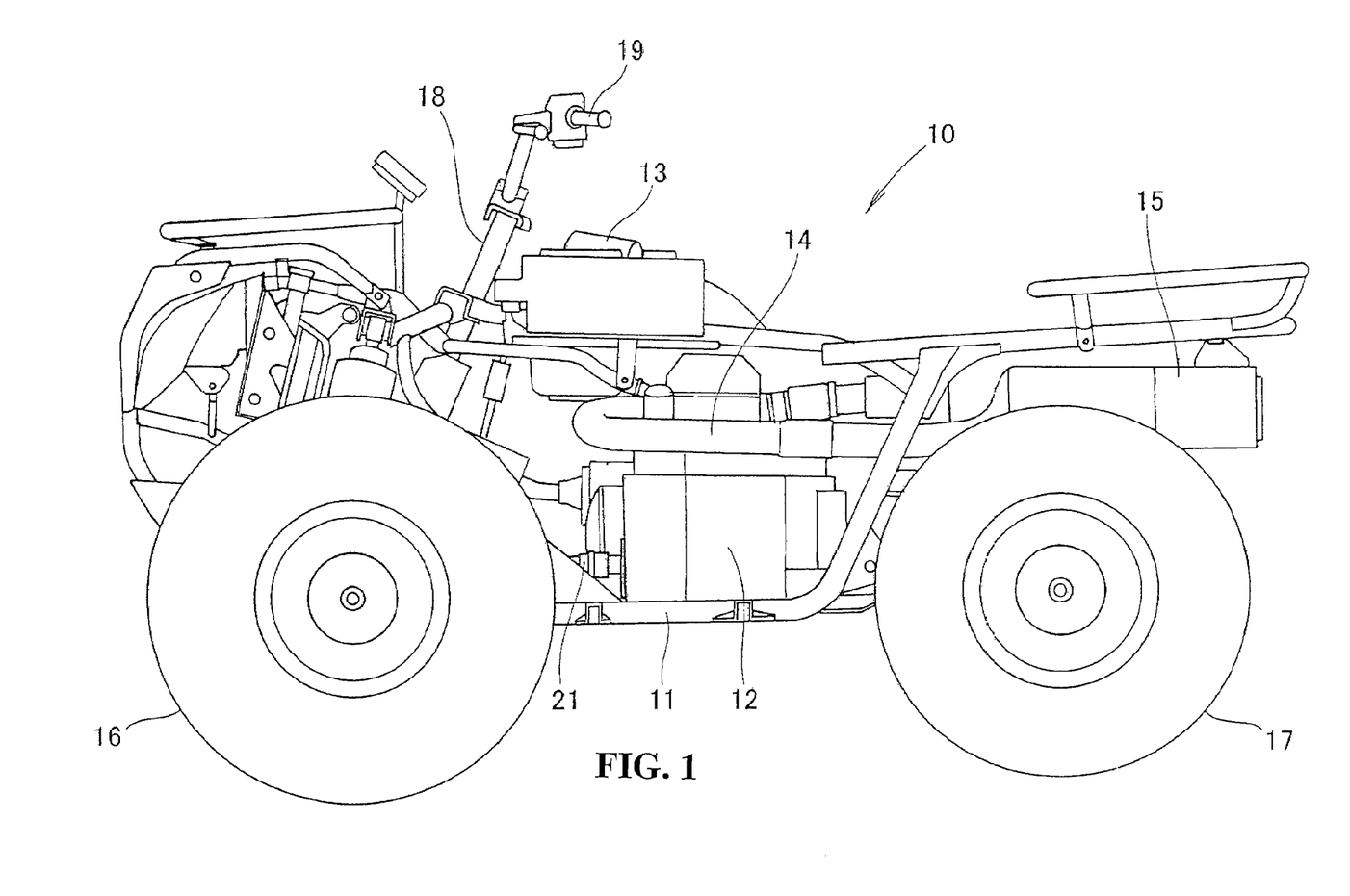
FIG. 1 is a left side view showing a vehicle according to the present invention.

As shown in FIG. 1, a vehicle 10 is a small-sized vehicle which is provided with a power generation engine 12 such as a gasoline engine in the center of a body frame 11 wherein fuel is mixed with air taken in an air cleaner 13 provided on the body frame 11 and the fuel is combusted in the power generation engine 12 with exhaust gas being exhausted outside via an exhaust pipe 14 extending from the power generation engine 12 and a muffler 15 connected to a rear end of the exhaust pipe 14. Power is transmitted to a front wheel 16 rotatably attached to a lower part of the front of the body frame 11 and/or a rear wheel 17 rotatably attached to a lower part of the rear of the body frame 11 so as to run the small-sized vehicle which can be steered by a steering shaft 18 turnably attached to an upper part of the front of the body frame 11 and a handlebar 19 for turning the steering shaft 18.

The type of power generation engine 12 does not matter if only the power generation engine is a driving source such as a gasoline engine, a diesel engine and an electric motor.

As irregularities of a road surface are absorbed by deforming a low-pressure tire and the wide tire can inhibit sinking even if the road surface is soft when the front wheel 16 and the rear wheel 17 are wide and low-pressure special tire called balloon tires. This type of vehicle 10 is commonly called an all terrain vehicle.

Figure 2:
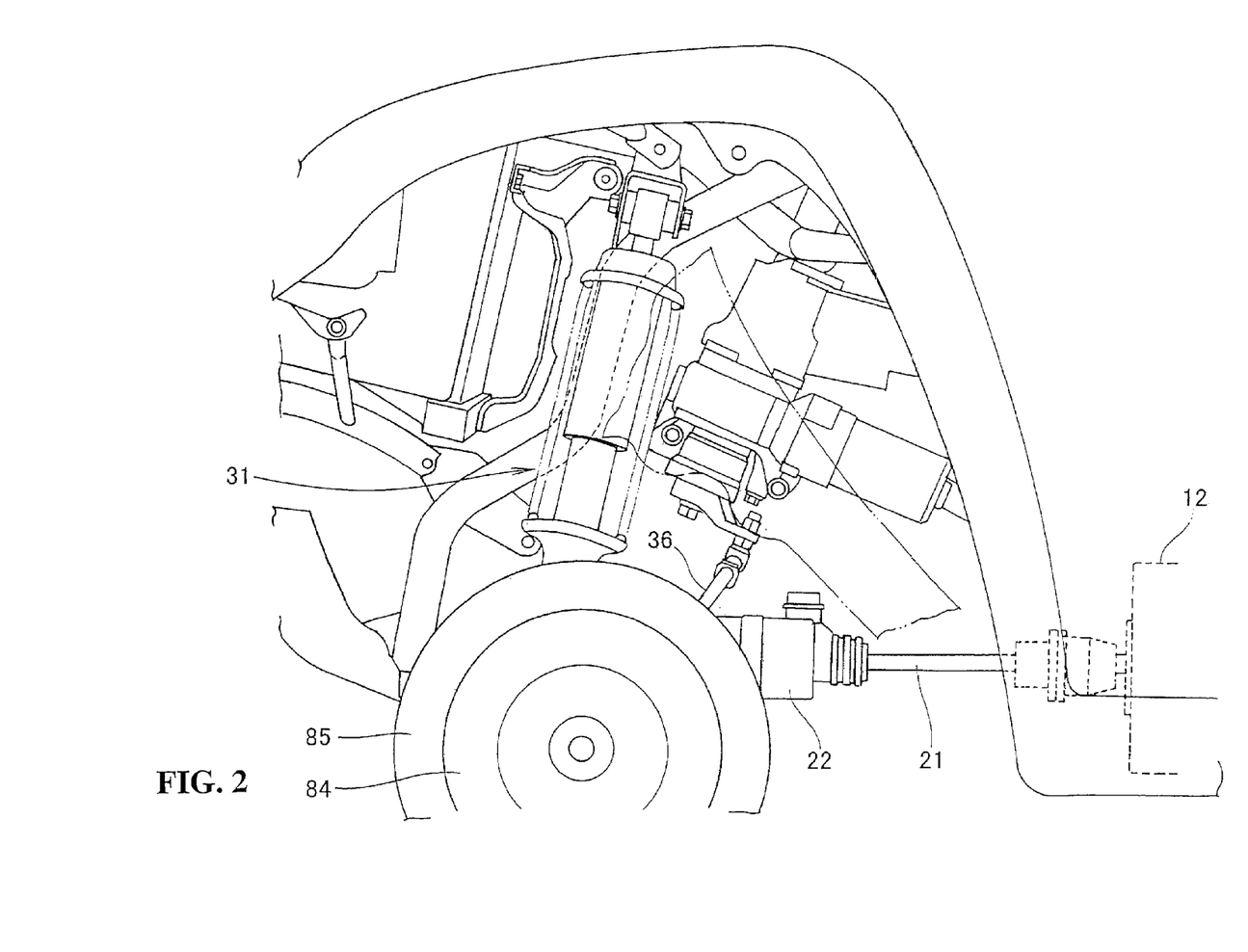
FIG. 2 shows a suspension system of a wheel.

Power generated in the power generation engine 12 is transmitted to a final reduction gear 22 via a transmission system 21 such as a propeller shaft as shown in FIG. 2.

Figure 3:
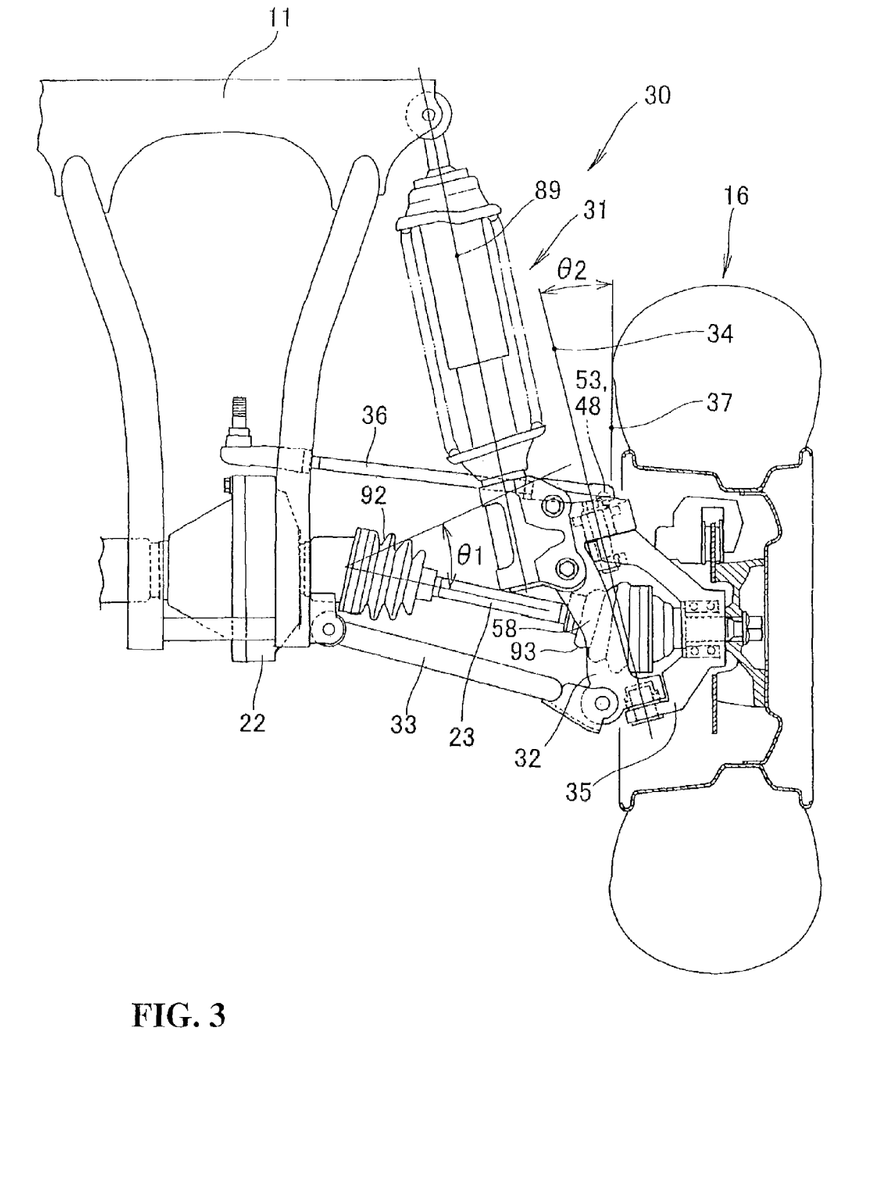
FIG. 3 is a front view showing the suspension system of the wheel.

As shown in FIG. 3, power is transmitted to the front wheel 16 via a drive shaft 23 extending in a direction of the vehicle width from the final reduction gear 22 and the front wheel 16 is rotatively driven.

As shown in FIG. 3, a suspension system 30 of the wheels is configured by a strut damper 31 an upper end of which is coupled to the body frame 11 and which extends downwardly, a knuckle supporting member 32 extends downwardly from a lower part of the strut damper 31, a lower arm 33 which extends in the direction of vehicle width and which couples a lower part of the knuckle supporting member 32 to the body frame 11, a knuckle 35 which is attached to the knuckle supporting member 32 rotatably around a king pin axis 34 and which supports the front wheel 16 and a tie rod 36 which extends in the direction of vehicle width and which rotates the knuckle 35 around the king pin axis 34. The details of each component will be described below.

The drive shaft 23 is vertically swung in a range θ1 of a swing according to a vertical motion of the front wheel 16.

In addition, a spherical joint 53 (the details will be described later) is attached to an end of the tie rod 36 and is coupled to a tie rod supporting part 48 (the details will be described later) extending in a direction of the surface and the back of the drawing (in a longitudinal direction of the vehicle) from the tie rod 36.

The tie rod supporting part 48 is provided in an area θ2 between a lateral line 37 passing an inner face of the front wheel 16 and the king pin axis 34.

Figure 4:
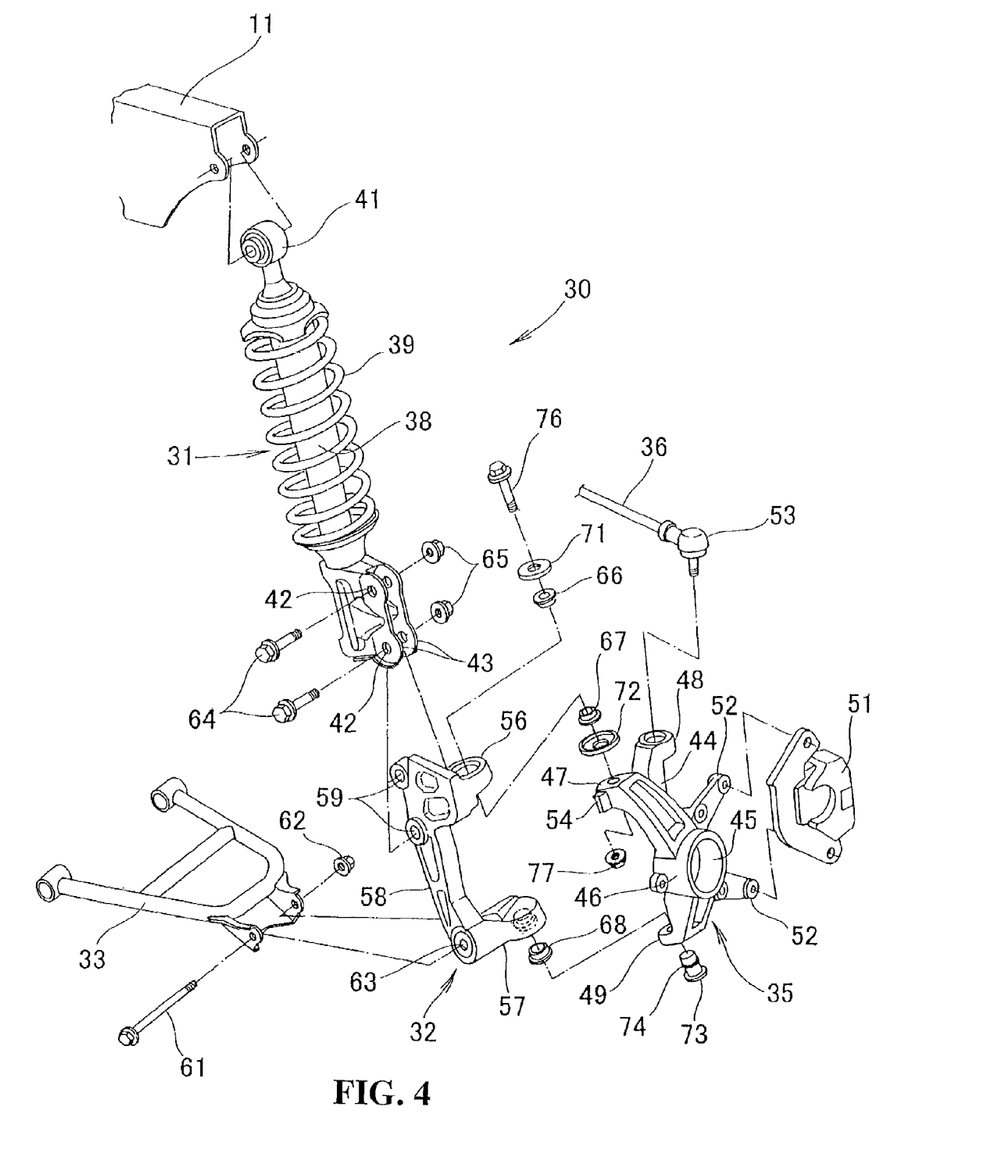
FIG. 4 is an exploded perspective view showing the suspension system of the wheel.

As shown in FIG. 4, the strut damper 31 is configured by a damper part 38 that dampens shock and a spring 39 which is provided around the damper part 38 and which restores the compressed damper part 38 to original length, and an upper end 41 of the damper part 38 is detachably coupled to the body frame 11. Longitudinal coupling parts 43 each of which has a plurality of (two in this example) bolt holes 42 are provided to a lower part of the damper part 38.

The knuckle 35 is an integrated part where an upper arm 47 and an extended part 44 extend upwardly from a boss 46 having a central hole 45, a lower arm 49 extends downwardly and caliper supporting parts 52 for supporting a brake caliper 51 are laterally extended.

The extended part 44 extends in a longitudinal direction of the vehicle and is provided with the tie rod supporting part 48. The spherical joint 53 at an end of the tie rod 36 is coupled to the tie rod supporting part 48. A stopper piece 54 extends forward in the vehicle from the upper arm 47. The action of the stopper piece 54 will be described later.

The lower arm 33 is an A-shaped pipe part in a top view for example.

The knuckle supporting member 32 is a C-shaped member in a left side view of the vehicle, and a backwards C-shaped member in a right side view of the vehicle, and is configured by an upper part supporting part 56 that supports an upper part (the upper arm 47) of the knuckle 35, a lower part supporting part 57 that supports a lower part (the lower arm 49) of the knuckle 35 and a bridge part 58 that connects the upper part supporting part 56 and the lower part supporting part 57. Bolt holes 59 bored in the longitudinal direction of the vehicle are provided to an upper part of the bridge part 58 and a bolt hole 63 connected to the lower arm 33 by a bolt 61 and a nut 62 is provided to the lower part.

An upper part of the knuckle supporting member 32 can be coupled to the lower part of the damper part 38 by putting the upper part of the knuckle supporting member 32 between the coupling parts 43 in the lower part of the damper part 38, inserting each bolt 64 into each bolt hole 42 and each bolt hole 59 and fastening each nut 65 to each bolt.

Figure 5:
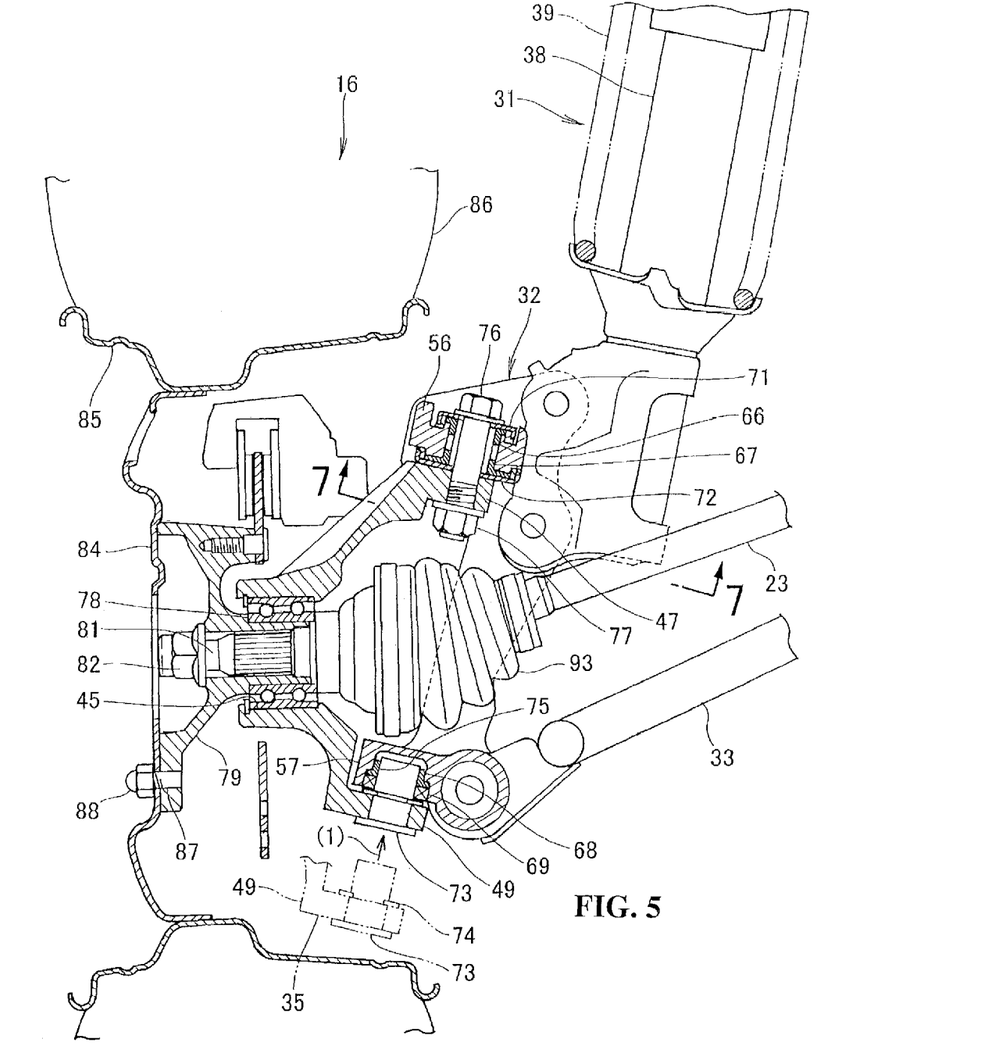
FIG. 5 is a back view showing the suspension system of the wheel.

Referring to FIG. 5 (a sectional view showing a main part viewed from the rear of the vehicle), the coupling of the knuckle supporting member 32 and the knuckle 35 will be described below.

As shown in FIG. 5, bushings 66, 67 having an L-shaped section are attached to the upper part supporting part 56. A bushing 68 having an L-shaped section is attached to the lower part supporting part 57, and a sealing member 69 is attached to the bushing. A presser lid 71 to which sealant is applied is attached to the bushing 66 from the upside and a presser lid 72 to which sealant is applied is attached to the bushing 67 from the downside.

At this time, the drive shaft 23 is not attached to the knuckle 35. A dowel 73 in the shape of a headed pin is inserted into the lower arm 49 of the knuckle 35 shown by an imaginary line upward from the downside and a snap ring 74 is fitted on the way of the dowel 73. As a result, the dowel 73 is prevented from falling out of the lower arm 49. As shown by an arrow (1), the knuckle supporting member 32 is wholly raised. The dowel 73 is inserted into a dowel hole 75 of the lower part supporting part 57 by the rise and the upper arm 47 is hit on the upper part supporting part 56 from the downside.

A bolt 76 is inserted into the bushes 66, 67 having the L-shaped section from the upside and is made to further pierce the upper arm 47. A nut 77 is fastened to the bolt 76.

A bearing 78 is fitted into the central hole 45 of the knuckle 35, a hub member 79 is fitted to the bearing 78, an end 81 of the drive shaft 23 is inserted into the hub member 79, and a nut 82 is attached to the end 81. As a result, the hub member 79 can be rotatably supported by the knuckle 35.

The front wheel 16 is configured by a spoke section 84, a limb 85 fixed to the periphery of the spoke section 84 and a tire 86 attached to the limb 85.

A bolt 87 extends outside the hub member 79 in the direction of vehicle width. The front wheel 16 can be attached to the hub member 79 by attaching the hub member 79 to the bolt 87 and tightening a nut 88.

Figure 6:
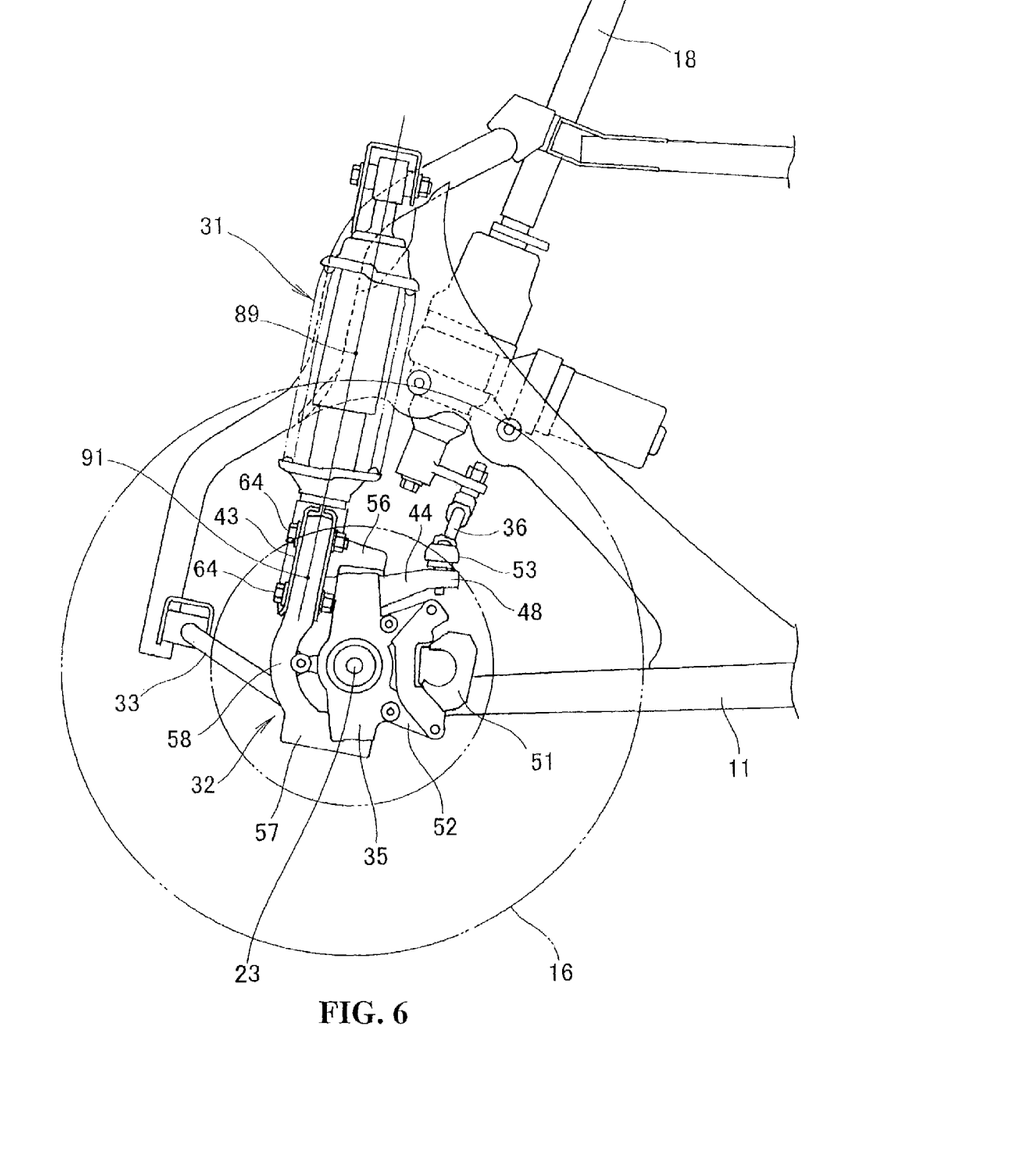
FIG. 6 is a side view showing the suspension system of the wheel.

Referring to FIG. 6, the action of the above-mentioned suspension system 30 will be described below.

As shown in FIG. 6, the strut damper 31 is arranged so that a downwardly extending line 91 of the axis 89 of the strut damper 31 passes in front of the drive shaft 23 extended to the depth in the drawing from the rotational center of the front wheel 16. More specifically, as interference between the strut damper 31 and the drive shaft 23 is not a concern, a mounting position of the strut damper 31 can be fully lowered. In addition, the length of the axis of the strut damper 31 can be fully secured. Therefore, the vehicle height can be lowered and moreover, the design of the vehicle body is facilitated.

The knuckle supporting member 32 is configured by the upper part supporting part 56 that supports the upper part of the knuckle 35, the lower part supporting part 57 that supports the lower part of the knuckle 35 and the bridge part 58 that connects the upper part supporting part 56 and the lower part supporting part 57. The bridge part 58 extends in parallel with the axis 89 of the strut damper 31.

As the bridge part 58 extends in parallel with the axis 89 of the strut damper 31, the bridge part 58 and the strut damper 31 can be connected with a lower end of the strut damper put along the bridge part. As the coupling part 43 can be fully lengthened, the strength of joining can be easily secured without making the structure of the coupling part 43 intricate.

In addition, as shown in FIG. 3, the bridge part 58 is arranged outside the axis 89 of the strut damper 31 in the direction of vehicle width. That is, the bridge part 58 is set off outside the axis 89 of the strut damper 31 in the direction of vehicle width. As a result, the upper part supporting part 56 extending in the longitudinal direction of the vehicle from the upper part of the bridge part 58 can extend in the longitudinal direction of the vehicle without interfering with the strut damper 31 as shown in FIG. 6.

As shown in FIG. 6, the tie rod supporting part 48 formed in the knuckle 35 is provided at the back of the drive shaft when the downwardly extending line 91 of the axis 89 of the strut damper 31 is located in front of the drive shaft 23. Or the tie rod supporting part 48 formed in the knuckle 35 is provided in front of the drive shaft 23 when the downwardly extending line is located at the back of the drive shaft 23. More specifically, the knuckle supporting member 32 is arranged on one side with the drive shaft 23 in the center and the tie rod 36 is arranged on the other side. As a result, the tie rod 36 can be easily arranged without interfering with the knuckle supporting member 32.

Similarly, the caliper supporting part 52 formed in the knuckle 35 is provided at the back of the drive shaft 23 when the downwardly extending line 91 of the axis 89 of the strut damper 31 is located in front of the drive shaft 23. Or the caliper supporting part 52 is provided in front of the drive shaft 23 when the downwardly extending line is located at the back of the drive shaft 23. More specifically, the knuckle supporting member 32 is arranged on one side with the drive shaft 23 in the center and the brake caliper 51 being arranged on the other side. As a result, the brake caliper 51 can be easily arranged without interfering with the knuckle supporting member 32.

As shown in FIG. 3, the drive shaft 23 is a constant-velocity ball joint provided with a boot 92 at an end on the side of the vehicle body and a boot 93 at an end on the side of the wheel, and the boot 93 on the side of the wheel is arranged in a position overlapped with the bridge part 58 in a front view of the vehicle.

The bridge part 58 plays a role in guarding foreign matter such as a flying stone from being projected towards the boot 93 on the side of the wheel. More specifically, a boot protective cover can be omitted.

In addition, as shown in FIG. 3, the lower end of the strut damper 31 extends to a position overlapped with the range θ1 of the swing of the drive shaft 23 in the front view of the vehicle.

As a result, a position of an upper end of the strut damper 31 is lowered, the vehicle height can be fully lowered, and the center of gravity of the vehicle can be lowered.

Next, a steering angle stopper will be described.

Figure 7:
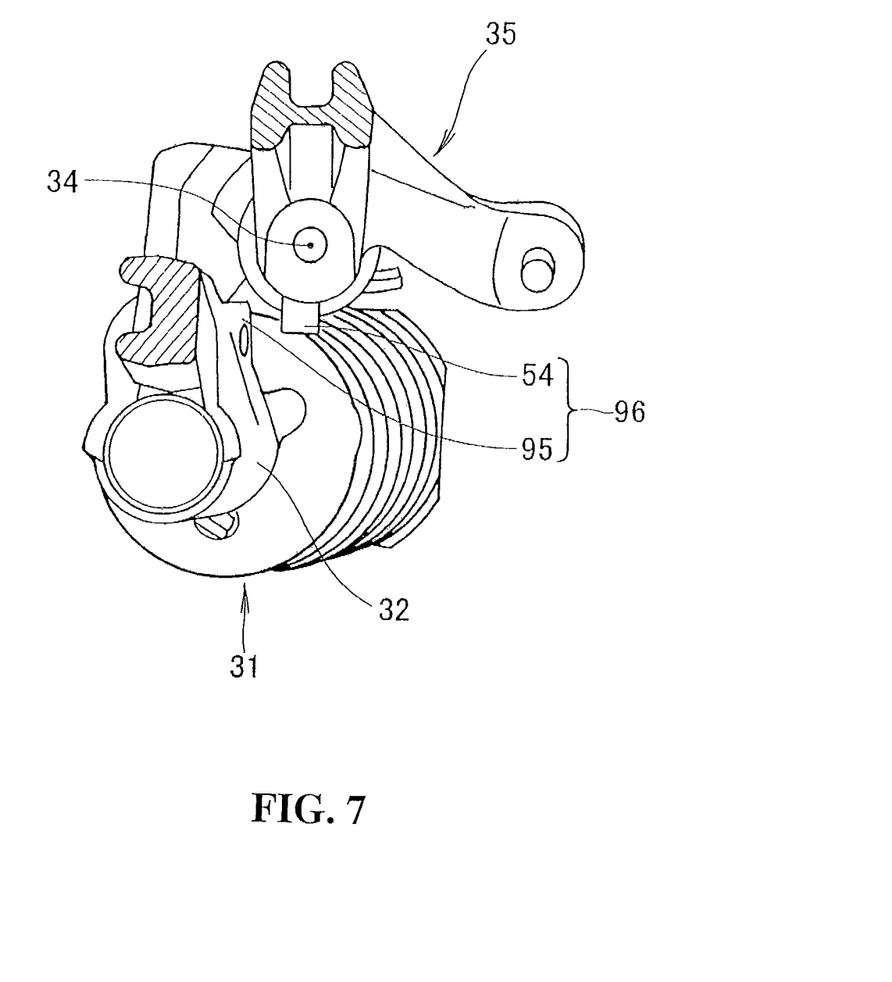
FIG. 7 is a sectional view viewed along a line 7-7 in FIG. 5.

As shown in FIG. 7 which is a sectional view viewed along a line 7-7 in FIG. 5, the stopper piece 54 extends from the knuckle 35. A stopper receiving face 95 is formed on the knuckle supporting member 32. The steering angle stopper 96 is configured by the stopper receiving face 95 and the stopper piece 54.

Figure 8:
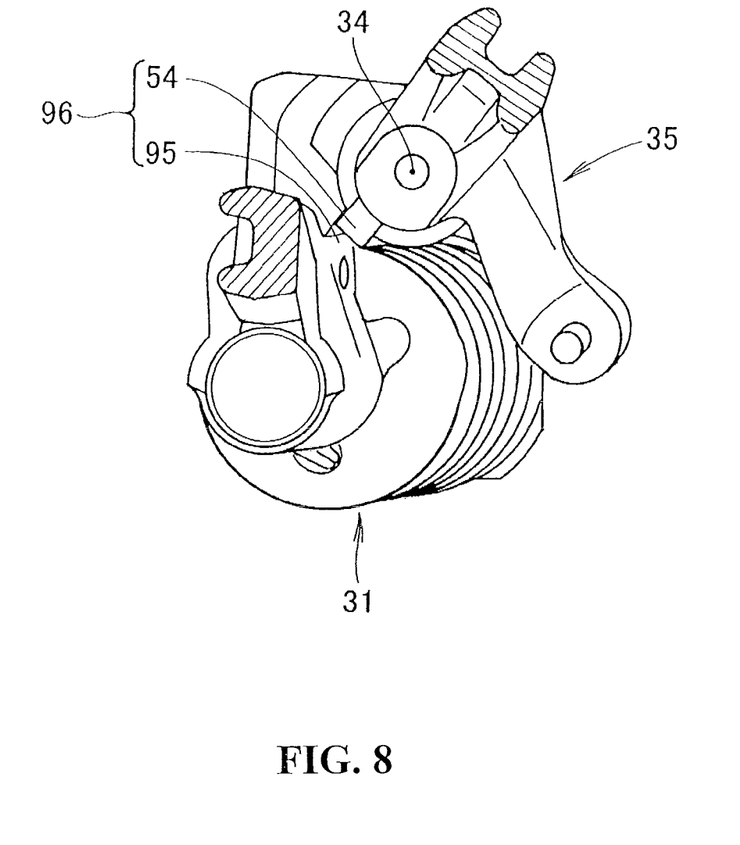
FIG. 8 shows the action of the parts shown in FIG. 7.

The stopper receiving face 95 is still. In the meantime, the stopper piece 54 revolves around the king pin axis 34. When the revolution reaches a predetermined angle, the stopper piece 54 hits on the stopper receiving face 95 as shown in FIG. 8 and a turning angle cannot be increased moreover.

More specifically, the steering angle stopper 96 that limits the turning angle of the wheel is provided between the knuckle supporting member 32 and the knuckle 35.

If the steering angle stopper is provided between the steering shaft and a stay that turnably supports the steering shaft, a stopper part is required to be provided to the steering shaft and the stay. Thus, the procurement cost and the installation cost of the parts increase.

In the meantime, according to the present invention, the stopper part configured by the stopper receiving face 95 and the stopper piece 54 for example has only to be formed in the knuckle supporting member 32 and the knuckle 35. As a result, no stopper part is required to be provided to the steering shaft and the stay and the procurement cost and the installation cost of the parts can be reduced.

The suspension system according to an embodiment of the present invention is applied to the all terrain vehicle. However, the suspension system may be also applied to other small-sized vehicles or to a general vehicle.

The suspension system according to an embodiment of the present invention is suitable for an all terrain vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A suspension system for use with a vehicle having a body frame, a power generation engine attached to the body frame for generating power, a transmission system for transmitting output generated by the power generation engine, a drive shaft extending in a direction of a width of the vehicle for transmitting power transmitted by the transmission system to a wheel, comprising:
   an upper end of a strut damper being coupled to the body frame and extending downwardly;
   a knuckle supporting member extending downwardly from a lower part of the strut damper;
   a lower arm extending in the direction of the width of the vehicle for coupling a lower part of the knuckle supporting member to the body frame;
   a knuckle rotatably attached to the knuckle supporting member around a king pin axis for supporting the wheel; and
   a tie rod extending in the width direction of the vehicle for rotating the knuckle around the king pin axis;
   wherein the strut damper is arranged in a location wherein a downwardly extending line of an axis of the strut damper is located in front of or at the back of the drive shaft in a side view of the vehicle,
   wherein the lower part of the strut damper is connected in a non-movable manner to an upper part of the knuckle supporting member with a pair of bolts.

2. The suspension system for use with the vehicle according to claim 1, wherein the knuckle supporting member is configured by an upper part supporting part for supporting an upper part of the knuckle, a lower part supporting part for supporting a lower part of the knuckle and a bridge part for connecting the upper part supporting part and the lower part supporting part; and the bridge part extends in parallel with the axis of the strut damper.

3. The suspension system for use with the vehicle according to claim 2, wherein the bridge part is arranged outside the axis of the strut damper in the direction of vehicle width; the upper part supporting part and the lower part supporting part extend in a longitudinal direction of the vehicle from the bridge part; and the knuckle supporting member is a C-shaped member in a left side view of the vehicle, and a backwards C-shaped member in a right side view of the vehicle.

4. The suspension system for use with the vehicle according to claim 3, wherein a caliper supporting part for supporting a brake caliper for braking the wheel is formed in the knuckle; the caliper supporting part is provided at the back of the drive shaft when the downwardly extending line of the axis of the strut damper is located in front of the drive shaft in the side view of the vehicle; and the caliper supporting part is provided in front of the drive shaft when the downwardly extending line is located at the back of the drive shaft.

5. The suspension system for use with the vehicle according to claim 3, wherein the drive shaft is a constant-velocity ball joint provided with a boot at an end on a side of the wheel and at an end on a central side of the vehicle body; and the boot on the side of the wheel is arranged in a position overlapped with the bridge part in a front view of the vehicle.

6. The suspension system for use with the vehicle according to claim 2, wherein a tie rod supporting part formed in the knuckle to couple to the tie rod is provided at the back of the drive shaft when the downwardly extending line of the axis of the strut damper is located in front of the drive shaft in the side view of the vehicle; and the tie rod supporting part is provided in front of the drive shaft when the downwardly extending line is located at the back of the drive shaft.

7. The suspension system for use with the vehicle according to claim 2, wherein a caliper supporting part for supporting a brake caliper for braking the wheel is formed in the knuckle; the caliper supporting part is provided at the back of the drive shaft when the downwardly extending line of the axis of the strut damper is located in front of the drive shaft in the side view of the vehicle; and the caliper supporting part is provided in front of the drive shaft when the downwardly extending line is located at the back of the drive shaft.

8. The suspension system for use with the vehicle according to claim 2, wherein a steering angle stopper that limits a turning angle of the wheel is provided between the knuckle supporting member and the knuckle.

9. The suspension system for use with the vehicle according to claim 2, wherein the drive shaft is a constant-velocity ball joint provided with a boot at an end on a side of the wheel and at an end on a central side of the vehicle body; and the boot on the side of the wheel is arranged in a position overlapped with the bridge part in a front view of the vehicle.

10. The suspension system for use with the vehicle according to claim 1, wherein a tie rod supporting part formed in the knuckle to couple to the tie rod is provided at the back of the drive shaft when the downwardly extending line of the axis of the strut damper is located in front of the drive shaft in the side view of the vehicle; and the tie rod supporting part is provided in front of the drive shaft when the downwardly extending line is located at the back of the drive shaft.

11. The suspension system for use with the vehicle according to claim 10, wherein the drive shaft is a constant-velocity ball joint provided with a boot at an end on a side of the wheel and at an end on a central side of the vehicle body; and the boot on the side of the wheel is arranged in a position overlapped with a bridge part in a front view of the vehicle.

12. The suspension system for use with the vehicle according to claim 1, wherein a caliper supporting part for supporting a brake caliper for braking the wheel is formed in the knuckle; the caliper supporting part is provided at the back of the drive shaft when the downwardly extending line of the axis of the strut damper is located in front of the drive shaft in the side view of the vehicle; and the caliper supporting part is provided in front of the drive shaft when the downwardly extending line is located at the back of the drive shaft.

13. The suspension system for use with the vehicle according to claim 12, wherein a steering angle stopper that limits a turning angle of the wheel is provided between the knuckle supporting member and the knuckle.

14. The suspension system for use with the vehicle according to claim 1, wherein a steering angle stopper that limits a turning angle of the wheel is provided between the knuckle supporting member and the knuckle.

15. The suspension system for use with the vehicle according to claim 1, wherein the knuckle includes an upper part pivotably mounted against a lower face of an upper part supporting part of the knuckle support member, and a lower part of pivotably mounted against a lower face of a lower supporting part of the knuckle support member, and wherein the knuckle support member includes a bridge part for connecting the upper part supporting part and the lower part supporting part, wherein the bridge part extends in parallel with the axis of the strut damper.

16. The suspension system for use with the vehicle according to claim 15, wherein the tie rod is connected to a tie rod supporting part formed in the knuckle, the tie rod supporting part extending rearwardly from the upper part of the knuckle so that the tie rod is connected to the tie rod supporting part at a position above and rearward of the drive shaft.

17. The suspension system for use with the vehicle according to claim 16, wherein a caliper supporting part for supporting a brake caliper for braking the wheel is formed in a portion of the knuckle below the tie rod supporting part.

18. The suspension system for use with the vehicle according to claim 1, wherein a lower end of the strut damper extends to a position overlapped with a swinging area of the drive shaft in a front view of the vehicle.

19. A suspension system for use with a vehicle having a body frame, a power generation engine attached to the body frame for generating power, a transmission system for transmitting output generated by the power generation engine, a drive shaft extending in a direction of a width of the vehicle for transmitting power transmitted by the transmission system to a wheel, comprising:

an upper end of a strut damper being coupled to the body frame and extending downwardly;

a knuckle supporting member extending downwardly from a lower part of the strut damper;

a lower arm extending in the direction of the width of the vehicle for coupling a lower part of the knuckle supporting member to the body frame;

a knuckle rotatably attached to the knuckle supporting member around a king pin axis for supporting the wheel; and a tie rod extending in the width direction of the vehicle for rotating the knuckle around the king pin axis;

wherein the strut damper is arranged in a location wherein a downwardly extending line of an axis of the strut damper is located in front of the drive shaft in a side view of the vehicle, and a tie rod supporting part of the knuckle can be seen to extend rearwardly from an upper part of the knuckle in a position adjacent where the upper part of the knuckle is pivotably supported by the knuckle supporting member, wherein the knuckle includes an upper part pivotably mounted against a lower face of an upper part supporting part of the knuckle support member, and a lower part of pivotably mounted against a lower face of an lower supporting part of the knuckle support member, and wherein the knuckle support member includes a bridge part for connecting the upper part supporting part and the lower part supporting part, wherein the bridge part extends in parallel with the axis of the strut damper.

* * * * *